(12) United States Patent
Kua

(10) Patent No.: US 7,849,764 B2
(45) Date of Patent: Dec. 14, 2010

(54) BICYCLE SHIFT OPERATING DEVICE

(75) Inventor: Wei Hock Kua, Singapore (SG)

(73) Assignee: Shimano (Singapore) Pte., Ltd., Jurong Town (SG)

( * ) Notice: Subject to any disclaimer, the term of this patent is extended or adjusted under 35 U.S.C. 154(b) by 1028 days.

(21) Appl. No.: 11/641,761

(22) Filed: Dec. 20, 2006

(65) Prior Publication Data

US 2008/0148898 A1    Jun. 26, 2008

(51) Int. Cl.
*F16C 1/10* (2006.01)
*G05G 11/00* (2006.01)
*G05G 13/00* (2006.01)

(52) U.S. Cl. ............................ 74/502.2; 74/489; 74/475
(58) Field of Classification Search ................ 74/502.2, 74/475, 489, 527, 473.14
See application file for complete search history.

(56) References Cited

U.S. PATENT DOCUMENTS

| | | | |
|---|---|---|---|
| 3,886,806 A | 6/1975 | Nagano | |
| 3,943,794 A | 3/1976 | Shimada | |
| 4,196,643 A | 4/1980 | Nagano | |
| 4,876,913 A | 10/1989 | Romano | |
| 4,905,537 A | 3/1990 | Nagano | |
| 5,009,629 A | 4/1991 | Tagawa | |
| 5,588,331 A | 12/1996 | Huang et al. | |
| 5,622,083 A | 4/1997 | Kirimoto et al. | |
| 5,730,030 A * | 3/1998 | Masui ...................... 74/473.13 | |
| 5,904,069 A | 5/1999 | Rau et al. | |
| 5,957,002 A | 9/1999 | Ueng | |
| 6,220,111 B1 | 4/2001 | Chen | |
| 6,848,335 B1 * | 2/2005 | Kawakami .................. 74/502.2 |
| 6,862,948 B1 | 3/2005 | Calendrille, Jr. | |
| 7,526,979 B2 * | 5/2009 | Tsumiyama ................ 74/502.2 |
| 7,721,621 B2 * | 5/2010 | Kawakami .................. 74/502.2 |
| 2006/0130602 A1 * | 6/2006 | Kawakami ................ 74/473.14 |
| 2008/0092690 A1 * | 4/2008 | Kawakami .................. 74/502.2 |
| 2008/0202277 A1 * | 8/2008 | Miki .......................... 74/502.2 |

FOREIGN PATENT DOCUMENTS

| | | |
|---|---|---|
| BE | 340 622 A | 3/1927 |
| BE | 486 775 A | 1/1949 |
| CN | 1491850 A | 4/2004 |
| DE | 91 15 661 U1 | 3/1992 |
| EP | 1 564 131 A1 | 8/2005 |
| EP | 1 746 022 A2 | 1/2007 |

\* cited by examiner

*Primary Examiner*—Vinh T. Luong
(74) *Attorney, Agent, or Firm*—Global IP Counselors, LLP

(57) ABSTRACT

A bicycle shift operating device includes a mounting member, a shift operating member, a take-up member and a retaining mechanism. The mounting member includes a clamping portion and a cover. The shift operating member is rotatably coupled to the mounting member to move in opposite rotation directions. The take-up member is arranged to selectively pull and release a shift control cable in response to rotation of the shift operating member. The retaining mechanism is arranged to retain the take-up member in a plurality of positions. Preferably, a rotational angle limiting structure includes a first limiting portion formed on the clamping portion and a second limiting portion formed on the shift operating member that selectively engages the first limiting portion to limit rotational movement of the shift operating member. Preferably, the cover has a bush integrally formed with the cover as a one-piece, unitary member.

15 Claims, 10 Drawing Sheets

BICYCLE SHIFT OPERATING DEVICE

BACKGROUND OF THE INVENTION

1. Field of the Invention

This invention generally relates to bicycle shift operating device. More specifically, the present invention relates to a bicycle shift operating device, which has a relatively simple structure.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shifting mechanisms or shift operating devices.

The bicycle shifting mechanisms are parts of the bicycle transmission. The bicycle transmission typically includes front and rear shifting mechanisms designed to operate front and rear derailleurs to move the front and rear derailleurs laterally over a plurality of front and rear sprockets, respectively. The front and rear sprockets are usually coupled to the front crank and the rear wheel, respectively, such that the pedaling force from the rider is transferred to the rear wheel via the chain. Depending on the position of the chain on the front and rear sprockets, a variety of gear ratios can be provided.

In the past, shifting mechanisms or devices have been utilized that include one or more levers that are pivoted in order to wind and unwind an inner wire of a control cable. Alternatively, rotating hand grips have also been utilized to wind and unwind the inner wire of the control cable. Two shifting mechanisms are typically provided on multi-speed bicycles. Typically, one shifting mechanism is a front shifting mechanism, while the other shifting mechanism is a rear shifting mechanism. Each shifting mechanism usually has one shift cable coupled thereto that includes an inner wire. The wires of the front and rear shifting mechanisms are coupled to the front and rear derailleurs to shift the chain over the various front and rear sprockets, respectively. While these prior shifting devices work well, the prior shift levers do not always operate as well as desired by some riders and/or these prior shifting devices can be relatively complicated and expensive to manufacture and assemble.

In view of the above, it will be apparent to those skilled in the art from this disclosure that there exists a need for an improved bicycle shift operating device. This invention addresses this need in the art as well as other needs, which will become apparent to those skilled in the art from this disclosure.

SUMMARY OF THE INVENTION

One object of the present invention is to provide a bicycle shift operating device that smoothly and reliably operates a part of a bicycle transmission such as a bicycle derailleur.

Another object of the present invention is to provide a bicycle shift operating device that is relatively simple and inexpensive to manufacture and/or assemble.

The foregoing objects can basically be attained by providing a bicycle shift operating device that comprises a mounting member, a shift operating member, a take-up member, a retaining mechanism and a rotational angle limiting structure. The mounting member is configured to be attached to a bicycle. The mounting member includes a clamping portion and a cover removably attached to the clamping portion. The shift operating member is rotatably coupled to the mounting member to move in a first rotational direction and a second rotational direction opposite to the first rotational direction. The take-up member is rotatably coupled to the mounting member. The take-up member is arranged and configured to selectively pull and release a shift control cable in response to rotation of the shift operating member in the first and second rotational directions, respectively. The retaining mechanism is coupled between the mounting member and the take-up member to retain the take-up member in a plurality of positions. The rotational angle limiting structure includes a first limiting portion formed on the clamping portion of the mounting member and a second limiting portion formed on the shift operating member that selectively engages the first limiting portion to limit rotational movement of the shift operating member relative to the mounting member.

The foregoing objects can also basically be attained by providing a bicycle shift operating device comprising a mounting member, a shift operating member, a take-up member and a retaining mechanism. The mounting member is configured to be attached to a bicycle. The mounting member includes a clamping portion and a cover removably attached to the clamping portion. The cover has a bush integrally formed with the cover as a one-piece, unitary member. The shift operating member is rotatably mounted about the bush of the mounting member to move in a first rotational direction and a second rotational direction opposite to the first rotational direction. The take-up member is rotatably mounted about the bush of the mounting member. The take-up member is arranged and configured to selectively pull and release a shift control cable in response to rotation of the shift operating member in the first and second rotational directions, respectively. The retaining mechanism is coupled between the mounting member and the take-up member to retain the take-up member in a plurality of positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
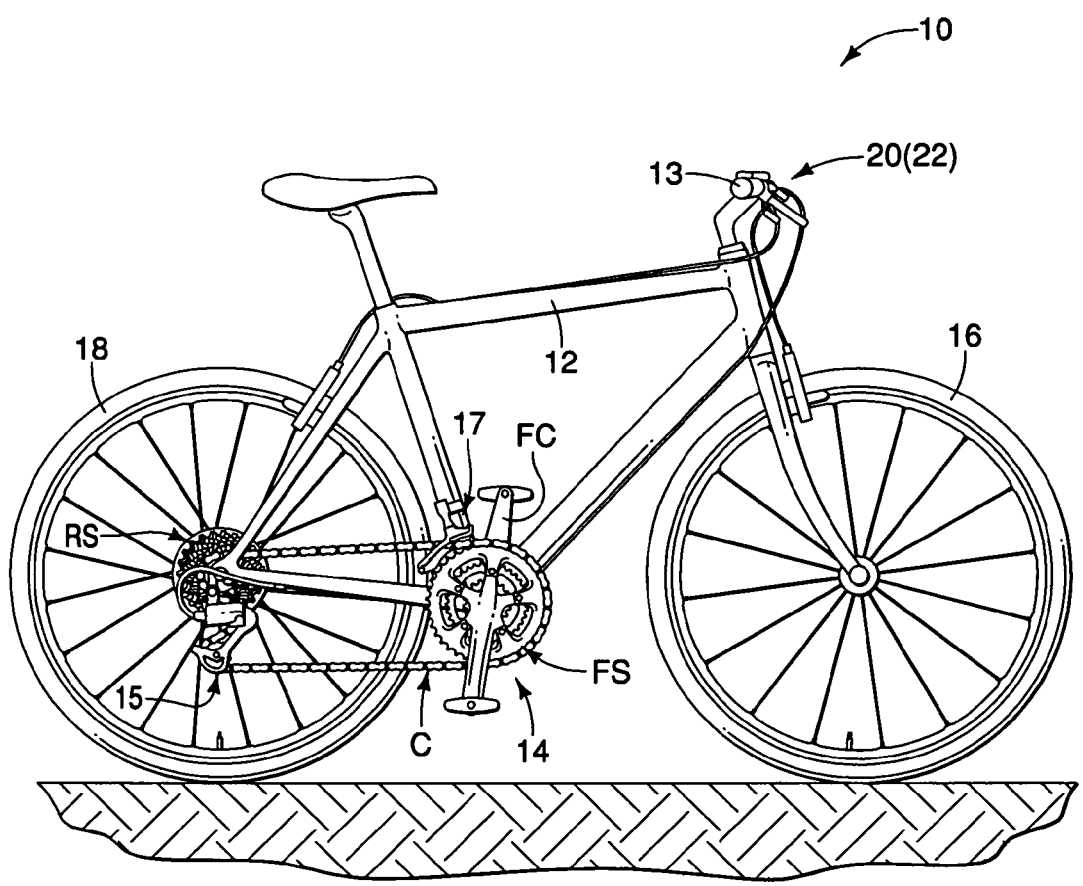
FIG. 1 is a side elevational view of a bicycle equipped with left and right hand side shift operating devices in accordance with a preferred embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1-3, 11 and 12, a bicycle 10 is illustrated with a rear shift operating device 20 and a front shift operating device 22 coupled thereto in accordance with a preferred embodiment of the present invention. Specifically, each of the rear and front shift operating devices 20 and 22 is retained in a plurality of rotational shift positions, yet has a relatively simple structure. The various parts of the bicycle 10 are conventional, except for the rear and front shift operating devices 20 and 22. Thus, the remaining parts of the bicycle 10 will not be discussed or illustrated in detail herein. It will be apparent to those skilled in the bicycle art from this disclosure that various modifications can be made to the various components or parts of the bicycle 10 without departing from the scope of the present invention.

Moreover, the front (left) shift operating device 22 is substantially identical to the right (rear) shift operating device 20, except that the front shift operating device 22 is a mirror image of the rear shift operating device 20 and has a modified retaining structure 136, as explained below. In the illustrated embodiment, each of the shift operating devices 20 and 22 is separate from the respective brake operating devices (only one shown in FIG. 1). However, it will be apparent to those skilled in the art from this disclosure that the shift operating devices 20 and 22 could be designed to have integrated brake operating devices if needed and/or desired.

The bicycle 10 basically includes a frame 12, a drive train or transmission 14, a front wheel 16 and a rear wheel 18. The frame 12 includes a handlebar 13 that is fixedly coupled to the front fork of the frame 12 to steer the bicycle 10 via the front wheel 16. The drive train or transmission 14 includes a rear derailleur 15, a front derailleur 17, a chain C, a plurality of rear sprockets RS coupled to the rear wheel 18 and a front crank FC with a plurality of front sprockets FS coupled thereto. The rear and front derailleurs 15 and 17 are coupled to the frame 12 to move/shift the chain C laterally between the various sprockets RS and FS, respectively, in a conventional manner. The rear sprockets RS are coupled to the rear wheel 18 via a free wheel (not shown) to selectively rotate the rear wheel 18 via the chain C in order to propel the bicycle 10 in a conventional manner.

The rear shift operating device 20 is operatively coupled to the rear derailleur 15 via a rear shift control cable 21 in order to shift the rear derailleur 15 laterally over the rear sprockets RS. Similarly, the front shift operating device 22 is operatively coupled to the front derailleur 17 via a rear shift control cable 23 to shift the front derailleur 17 laterally over the front sprockets FS in a relatively conventional manner. The rear and front shift control cables 21 and 23 are identical except for their lengths, and are basically conventional. Thus, the control cable 21 includes an inner wire 21a slidably received within an outer casing 21b, while the control cable 23 includes an inner wire 23a slidably received within an outer casing 23b.

Rear Shift Operating Device

Referring now to FIGS. 2-8, the rear shift operating device 20 basically includes a mounting member 30, a shift operating member 32, a take-up member 34, and a retaining mechanism 36. The mounting member 30 is configured to be fixedly coupled to a tubular portion of the bicycle 10 such as the handlebar 13. The shift operating member 32 is rotatably coupled to the mounting member 30 to move in first and second rotational directions $R_1$ and $R_2$ that are opposite to each other. The take-up member 34 is also rotatably coupled to the mounting member 30 to move in the first and second rotational directions $R_1$ and $R_2$ in order to selectively pull and release the inner wire 21a of the shift control cable 21 in response to rotation of the shift operating member 32 in first and second rotational directions $R_1$ and $R_2$, respectively. The retaining mechanism 36 is coupled between the mounting member 30 and the take-up member 34 to overrideably retain the take-up member 34 in a plurality (e.g. six) shift positions relative to the mounting member 30 such that the rider can move the shift operating member 32 to initiate up/down shifts of the rear derailleur 15.

The mounting member 30 basically includes a clamping portion 40, a cover 42 and an axle member 44 non-rotatably coupling the cover 42 to the clamping portion 40 to form a mounting space. The clamping portion 40 is fixedly attached (clamped) onto the handlebar 13 using a fastener 46. The fastener 46 preferably includes a bolt 46a and nut 46b arrangement. The nut 46b of the fastener 46 non-rotatably engages part of the clamping portion 40, as illustrated herein. The axle member 44 is non-rotatably attached to the clamping portion 40. The axle member 44 extends through the cover 42 to non-rotatably support the cover 42. The shift operating member 32 and the take-up member 34 are at least partially disposed between the clamping portion 40 and the cover 42 to rotate relative thereto.

Referring to FIGS. 2-4, 7 and 8, the clamping portion 40 basically includes a first clamping element 48 and a second clamping element 50 pivotally coupled to the first clamping element 48 via a separable hinge arrangement. The free ends of the first and second clamping elements 48 and 50 are releasably attached together using the bolt 46a and the nut 46b of the fastener 46 in order to reduce the internal diameter of the clamping portion 40 so as to be clamped onto the handlebar 13. Specifically, the nut 46b non-rotatably engages the second clamping element 50, while the bolt 46a extends through the first clamping element 48.

The first clamping element 48 basically includes a first curved clamping section 48a, a hook section 48b and a first attachment section 48c. Preferably, the clamping section 48a, the hook section 48b and the attachment section 48c are integrally formed together as a one-piece, unitary member from a lightweight rigid material such as sheet metal that is bent (deformed), punched, and/or machined to form the configuration illustrated herein. The first clamping section 48*a* has a curved clamping surface that contacts the handlebar 13. The hook section 48*b* engages the second clamping element 50, as explained below. The first attachment section 48*c* has a through bore that receives the bolt 46*a* of the fastener 46 therethrough.

The second clamping element 50 basically includes a second curved clamping section 50*a*, a hinge section 50*b*, a second attachment section 50*c*, and a support section 50*d*. Preferably, the clamping section 50*a*, the hinge section 50*b*, the attachment section 50*c* and the support section 50*d* are integrally formed together as a one-piece, unitary member from a lightweight rigid material such as sheet metal that is bent (deformed), punched, and/or machined to form the configuration illustrated herein. The clamping section 50*a* has a curved clamping surface that contacts the handlebar 13. The hinge section 50*b* has an elongated notch that receives the hook section 48*b* therein. The second attachment section 50*c* has an elongated slot that receives the elongated portion of the nut 46*b* of the fastener 46 therein such that the nut 46*b* is non-rotatable relative to the second attachment section 50*c*. The support section 50*d* is coupled to the cover 42 and the axle member 44 to rotatably support the shift operating member 32 and the take-up member 34.

Specifically, the support section 50*d* has a flat plate-shaped configuration with a central through hole 51*a*, a pair of arc-shaped through holes 51*b* disposed about the central hole 51*a* and a projection 51*c* extending outwardly from the support section 50*d* relative to the handlebar 13 when mounted thereto. The support section 50*d* is disposed between the clamping section 50*a* and the hinge section 50*b*. The central hole 51*a* receives part of the cover 42 therein, while the arc-shaped holes 51*b* receive parts of the axle member 44 therein. The projection 51*c* selectively contacts the shift operating member 32 to limit rotational movement of the shift operating member 32. The projection 51*c* defines a first limiting portion with a pair of oppositely facing first abutment surfaces, as best understood from FIGS. 3 and 4.

Referring to FIGS. 2-5, the cover 42 basically includes a disc-shaped portion 42*a*, a bush 42*b* extending from the disc-shaped portion 42*a*, and a cable attachment member 42*c* extending substantially tangentially relative to the disc-shaped portion 42*a*. Preferably, the disc-shaped portion 42*a*, the bush 42*b* and the cable attachment member 42*c* are integrally formed together as a one-piece, unitary member from a lightweight rigid material such as a hard plastic material that is cast and/or machined to form the configuration illustrated herein. The shift operating member 32 and the take-up member 34 are rotatably supported on the bush 42*b*. Preferably, the material of the cover 42 has a relatively low coefficient of friction. A conventional barrel adjuster BA is preferably threadedly attached cable attachment member 42*c*.

The disc-shaped portion 42*a* has a bow-tie shaped recess 43*a* formed in the outer surface thereof. The bush 42*a* has a pair of arc-shaped slots 43*b* disposed in a free end of the bush 42*b*. A tubular recess 43*c* extends between the arc-shaped slots 43*b* and the bowtie-shaped recess 43*a*. A centrally disposed protrusion 43*d* extends from the free end of the bush 42*b*. The centrally disposed protrusion 43*d* is received in the central through hole 51*a* of the second clamping element 50. An annular internal surface of the disc-shaped portion 42*a* includes a plurality (e.g., six) notches 43*e* formed therein. The disc-shaped portion 42*a* further includes a pair of arc-shaped protruding sections 43*f* and 43*g* that may optionally contact the shift operating member 32 in one and/or both of its end positions. The bush 42*a* has a stepped external surface (shape) that mates with a stepped internal surface (hole) of the shift operating member 32, as explained below.

Referring to FIGS. 2-4 and 6, the axle member 44 basically includes a first engagement portion 44*a*, a second engagement portion 44*b* and a tubular shaft portion 44*c* extending between the first and second engagement portions 44*a* and 44*b*. Preferably, the first engagement portion 44*a*, the second engagement portion 44*b* and the tubular shaft portion 44*c* are integrally formed together as a one-piece, unitary member from a lightweight rigid material such as sheet metal that is bent (deformed), punched, and/or machined to form the configuration illustrated in FIGS. 4 and 6. Preferably, at least the second engagement portion 44*b* is plastically bendable into the position shown in FIG. 3 in order to attach the second engagement portion 44*b* to the second clamping element 50 of the clamping portion 40.

The first engagement portion 44*a* includes a pair of opposed fan-shaped plates 45*a* that extend radially outwardly from the shaft portion 44*c*. The fan-shaped plates 45*a* are received in the bowtie-shaped recess 43*a* of the disc-shaped portion 42 of the cover 42 in order to non-rotatably couple first engagement portion 44*a* of the axle member 44 to the disc-shaped portion 42*a* of the cover 42. The shaft section 44*c* of the axle member 44 is received in the tubular recess 43*c* of the cover 42, while a pair of arc-shaped fingers 45*b* of the second engagement portion 44*b* extend through the arc-shaped slots 43*b* of the bush 42*b* into the arc-shaped holes 51*b* of the second clamping element 50. The free ends of the arc-shaped fingers 45*b* are bent radially outwardly into the positions illustrated FIG. 3 in order to fixedly attach the cover 42 and the axle member 44 to the clamping portion 40. A pair of opposed notches 45*c* are preferably formed at the inner periphery of the fan-shaped plates 45*a* in order to receive a tool or the like during bending of the arc-shaped fingers 45*b*.

Figure 2:
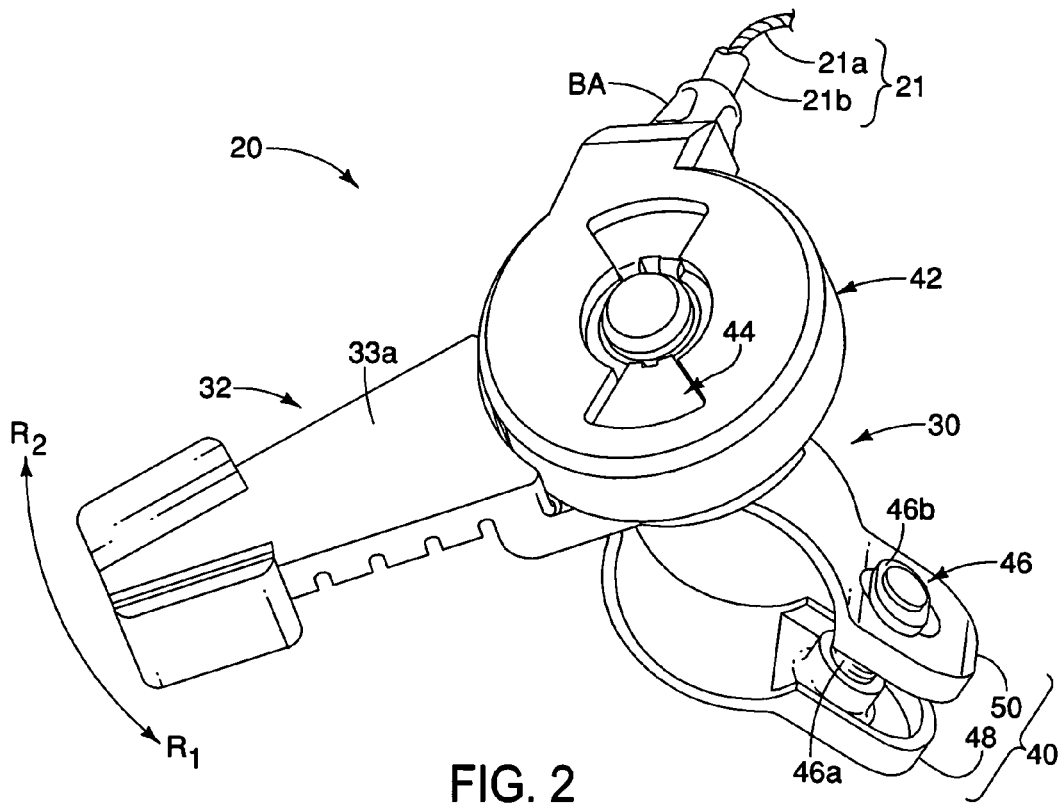
FIG. 2 is an enlarged top perspective view of the right hand side shift operating device of the bicycle illustrated in FIG. 1.
Figure 3:
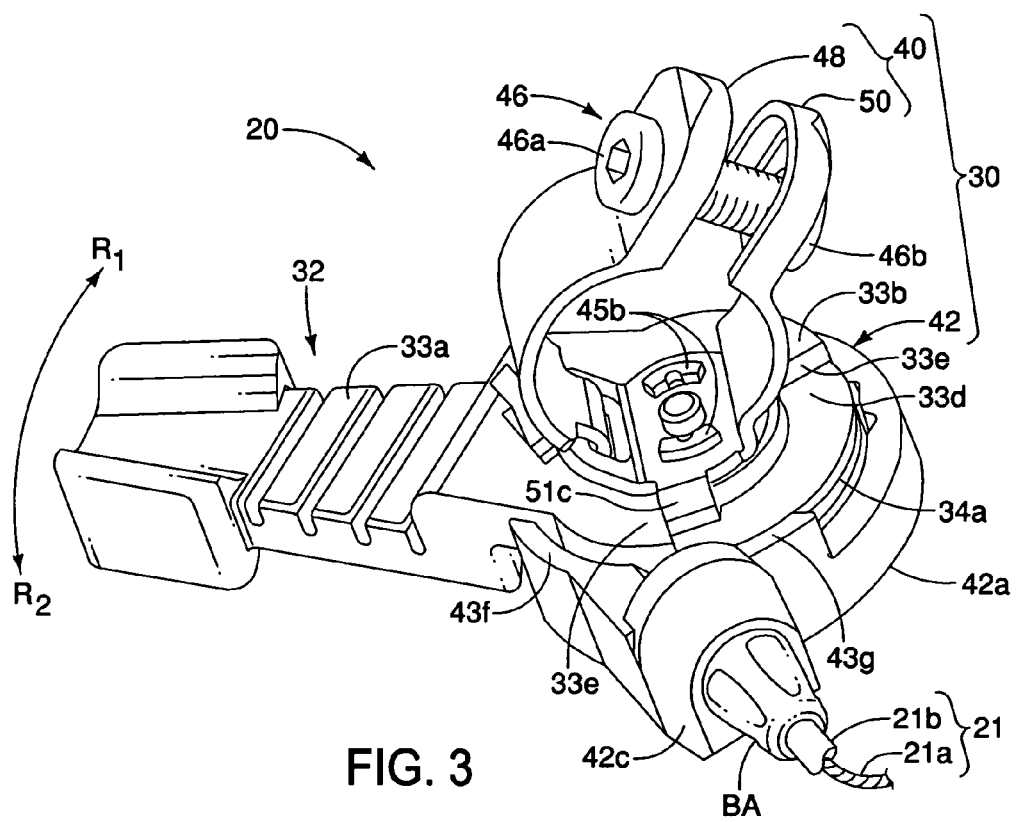
FIG. 3 a bottom perspective view of the right hand side shift operating device of the bicycle illustrated in FIG. 2.
Figure 4:
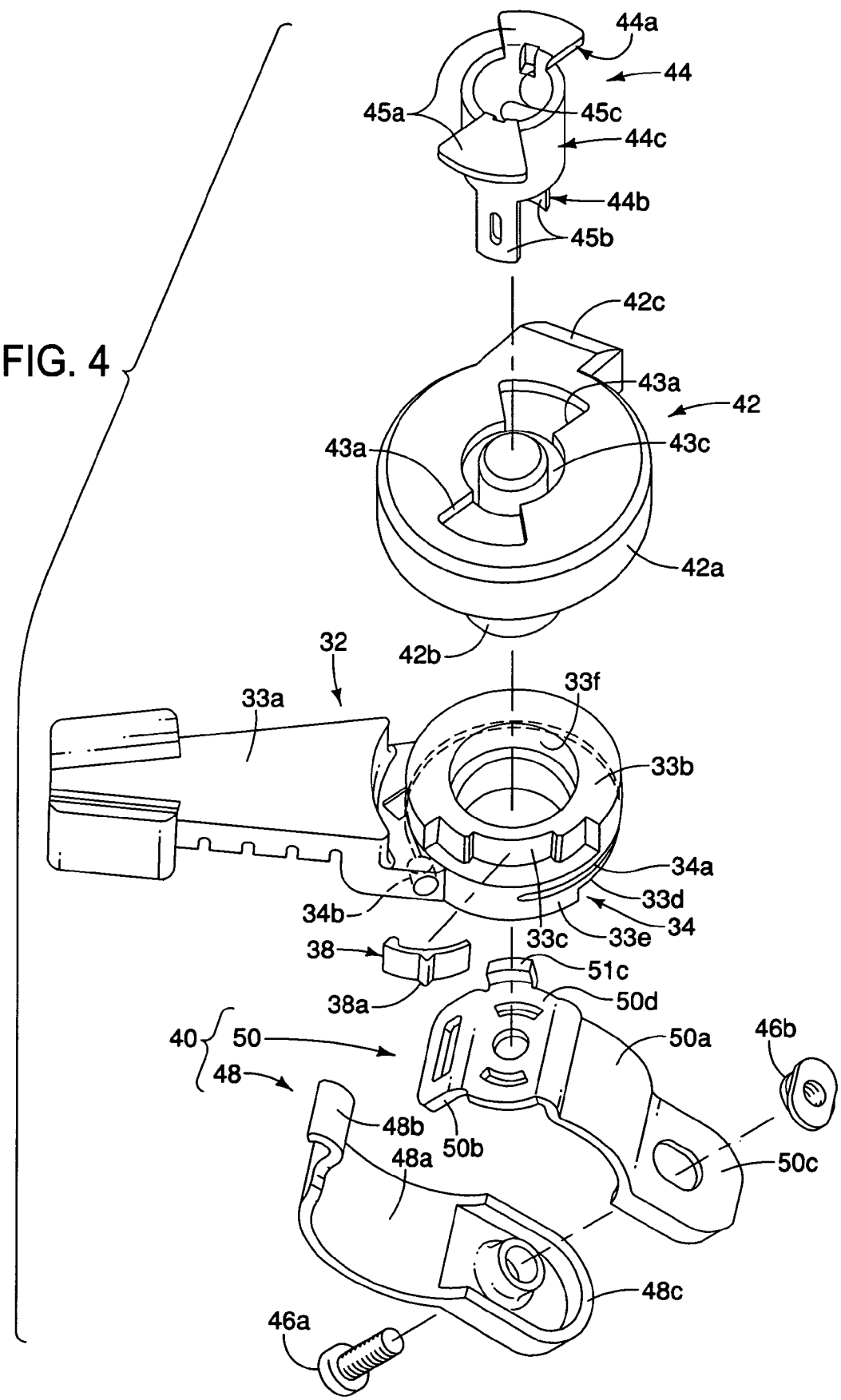
FIG. 4 is an exploded, upper perspective view of the right hand side shift operating device illustrated in FIGS. 2 and 3.
Figure 5:
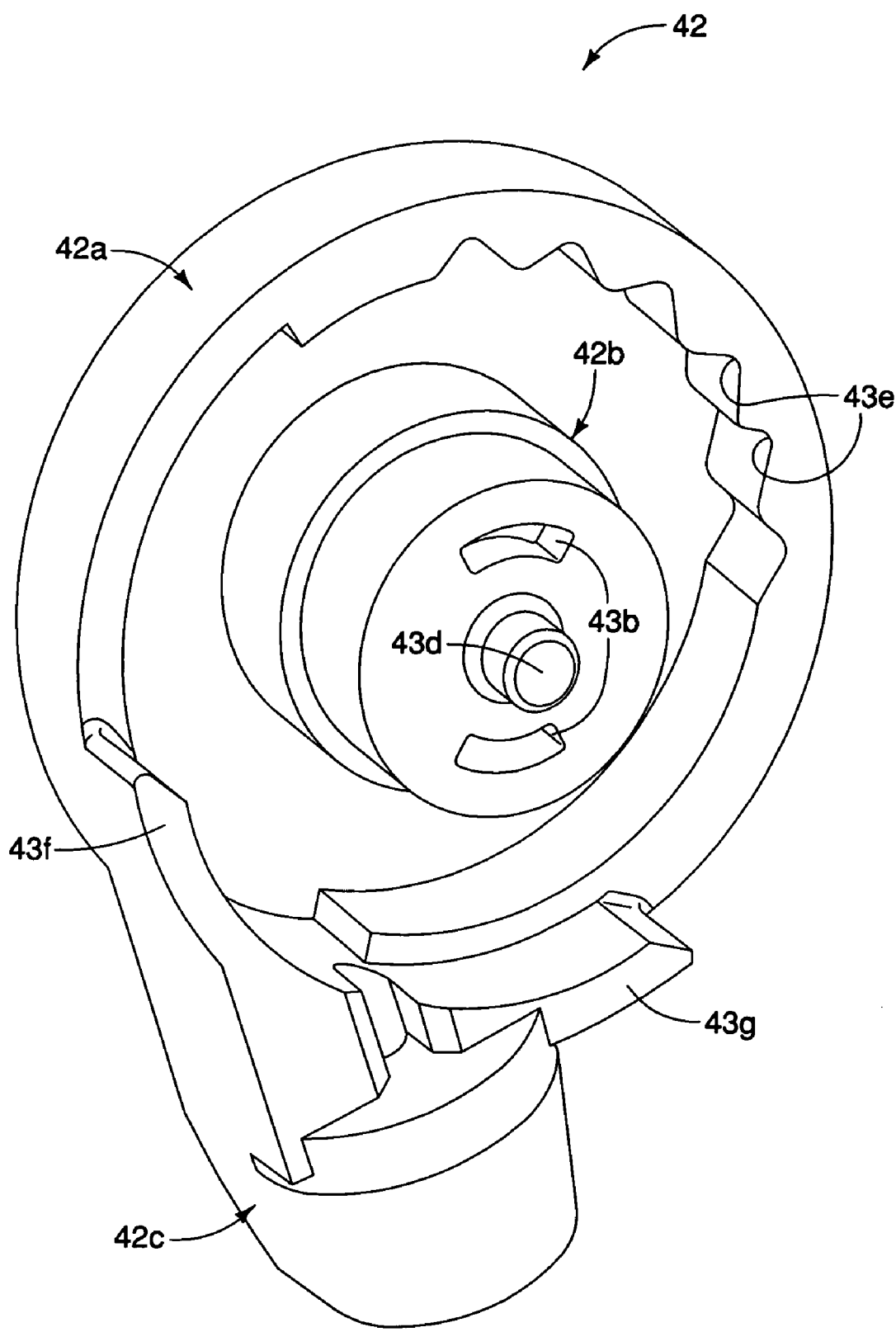
FIG. 5 is a further enlarged, lower perspective view of the cover of the shift operating device illustrated in FIGS. 2-4.
Figure 6:
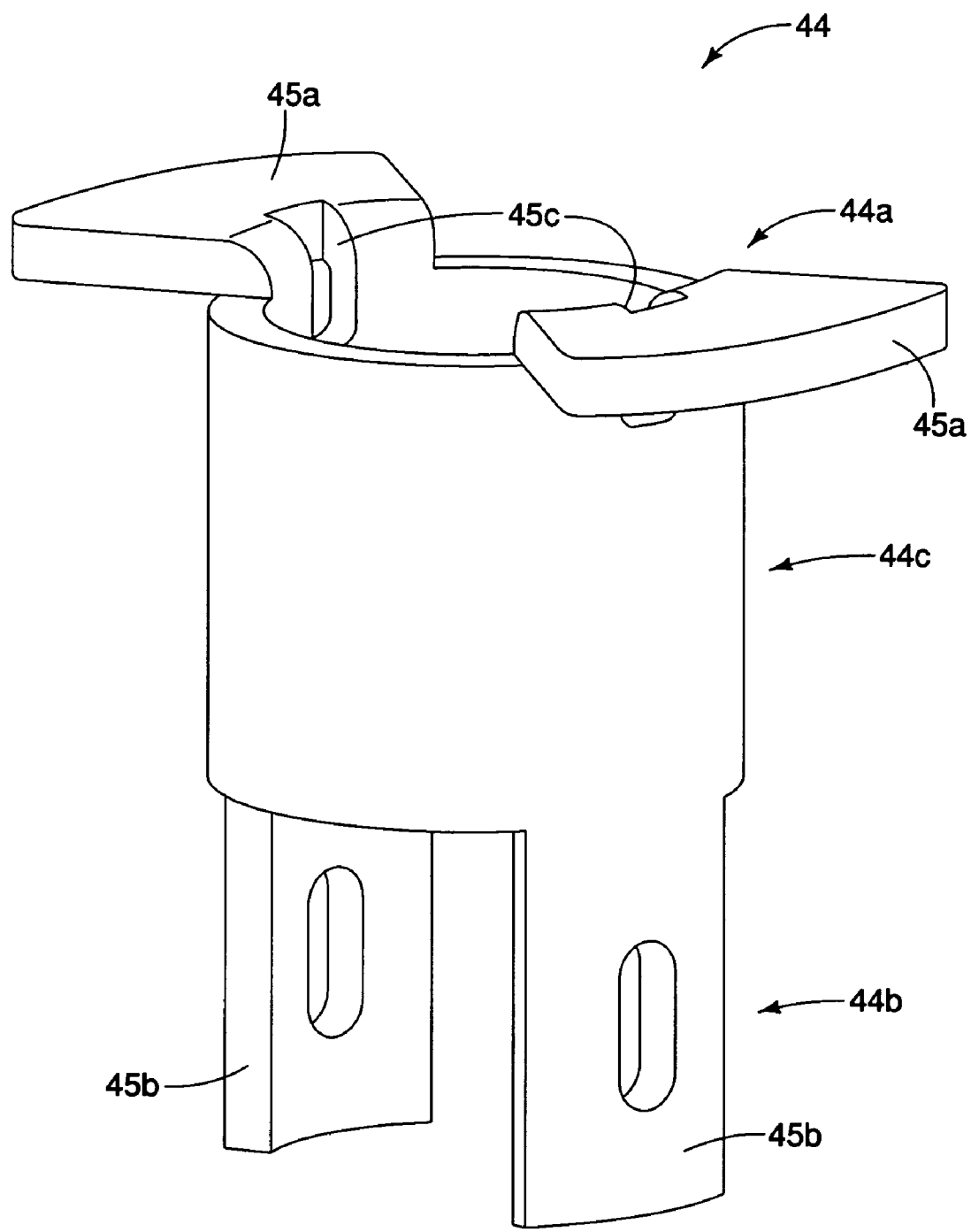
FIG. 6 is a further enlarged, side perspective view of the axle illustrated in FIG. 4.
Figure 7:
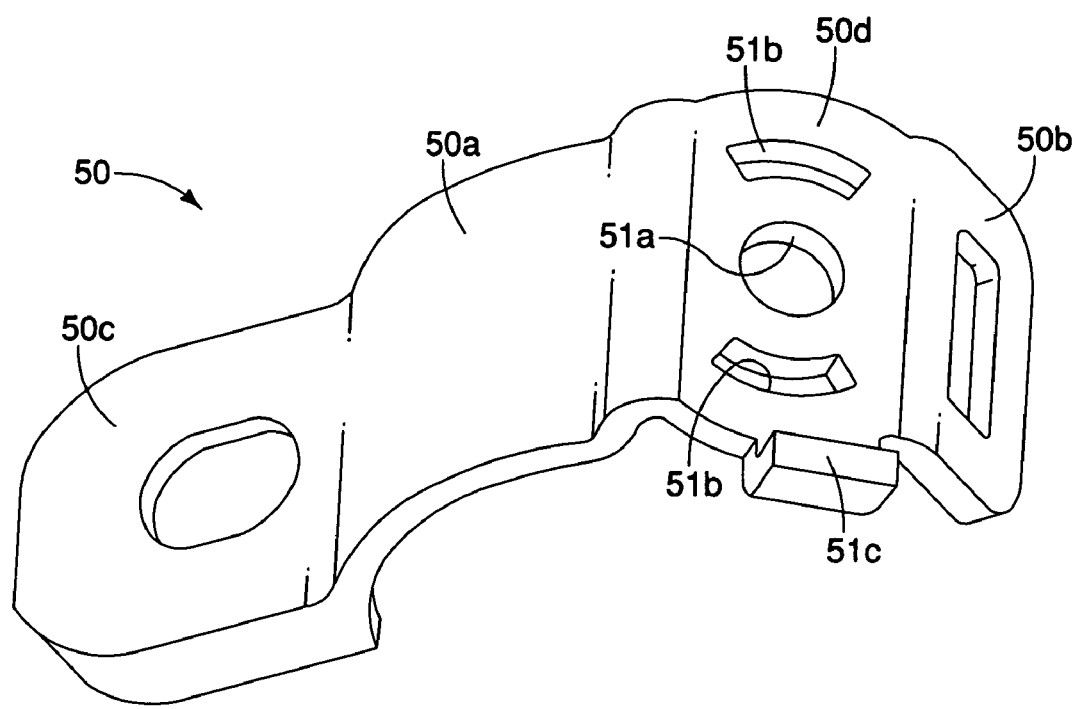
FIG. 7 is a further enlarged, upper perspective view of the first clamping element illustrated in FIG. 4.
Figure 8:
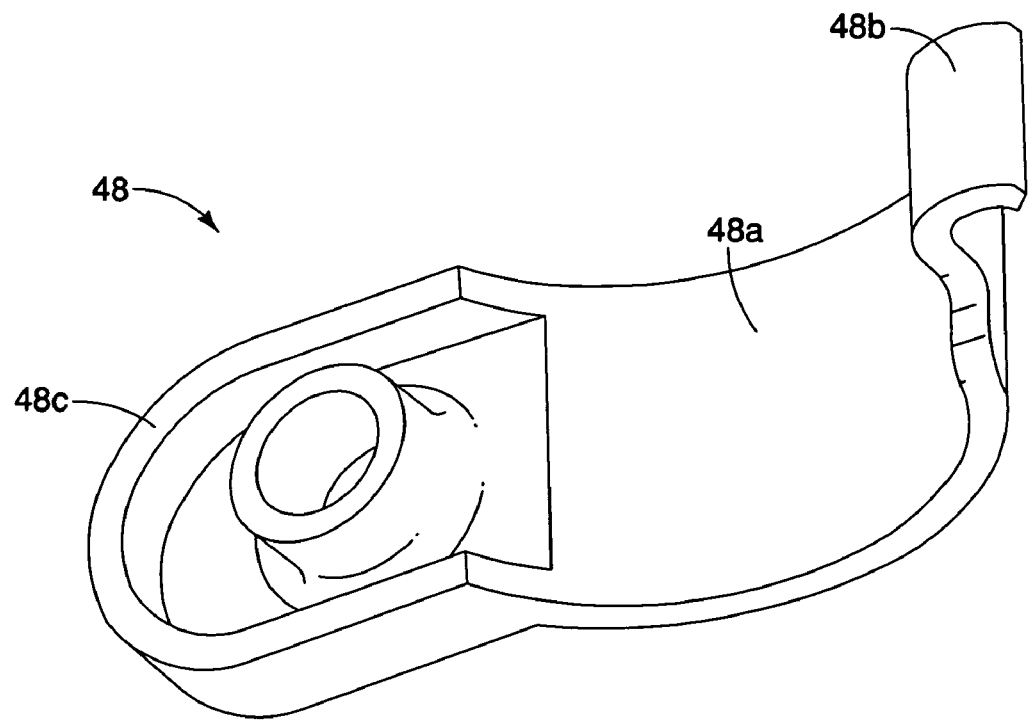
FIG. 8 is a further enlarged, upper perspective view of the second clamping element illustrated in FIG. 4.

Referring to FIGS. 2-4, the shift operating member 32 and the take-up member 34 will now be explained in more detail. In the illustrated embodiment, the take-up member 34 is non-movably fixed to the shift operating member 32. More specifically, in the illustrated embodiment, the take-up member 34 and the shift operating member 32 are preferably integrally formed together as a one-piece, unitary member from a lightweight rigid material such as a hard plastic material that is cast and/or machined to form the configuration illustrated herein. Preferably, the take-up member 34 and the shift operating member 32 are not rotationally biased relative to the mounting member 30 by a biasing element (spring). Preferably, the material of the shift operating member 32 and take-up member 34 has a relatively low coefficient of friction.

The shift operating member 32 basically includes a lever portion 33*a* and an annular mounting portion 33*b*. The annular mounting portion 33*b* of operating member 32 is integrally formed with the take-up member 34. The annular mounting portion 33*b* of operating member 32 includes an arc-shaped (stepped) retaining recess 33*c* formed around an outer peripheral area of the upper end, an additional arc-shaped control recess 33*d* formed around an outer peripheral are of the lower end, and a stepped internal surface (hole) 33*f* configured to receive the bush 42*b*, as seen in FIGS. 3 and 4. The lever portion 33*a* is operable by a rider's hand (e.g., thumb or finger) so as to selectively rotate the shift operating member 32 and the take-up member 34 in the first and second rotational directions $R_1$ and $R_2$. An arc-shaped resilient pawl member 38 having a projecting tooth or detent 38*a* is mounted in the arc-shaped recess 33*c*. The pawl member 38 is engaged with the notches 43*e* of the cover 42 to normally retain the take-up member 34 and the shift operating member 32 in a desired position relative to the mounting member 30. Specifically, the detent 38a is releasably received in one of the notches 43e.

While only one detent 38a is illustrated in the rear shift operating device 20, it will be apparent to those skilled in the bicycle art from this disclosure that a plurality (e.g., two or three) detents 38a could be provided if needed and/or desired, like the front shift operating device 22. With such an arrangement, additional notches 43e can be included in a manner similar to the front shift operating device 22. In the illustrated embodiment, the pawl member 38, which is coupled to the shift operating member 32, and the notches 43e of the cover 42 constitute parts of a retaining mechanism 36 in accordance with the present invention. Moreover, in the illustrated embodiment, the notches 43e constitute parts of a pawl mating structure that engages to pawl 38 to selectively retain the shift operating member 32 and the take-up member in 34 a plurality of shift positions. While the pawl mating structure illustrated herein is integrally formed with the cover 42, it will be apparent to those skilled in the bicycle art from this disclosure that a separable member or members having the pawl mating structure may be included if needed and/or desired. In other words, it will be apparent to those skilled in the bicycle art from this disclosure that various pawl and pawl mating structure configurations can be provided without departing from the scope of the present invention.

Preferably, the take-up member 34 and the shift operating member 32 are freely rotatable relative to the mounting member 30 (i.e. with low friction) such that the retaining mechanism 36 prevents undesirable rotation. In other words, the retaining mechanism 36 preferably provides a holding force larger than an opposing (biasing) force applied to the inner wire 21a by the rear derailleur 15 such that additional frictional forces are not required to prevent undesirable rotation of the take-up member 34 and the shift operating member 32. Thus, if the retaining mechanism 36 were removed from the shift operating device 20, the take-up member 34 and the shift operating member 32 would be basically freely rotatable with negligible frictional forces applied thereto.

The arc-shaped control recess 33d of the shift operating member 32 receives the projection 51c therein to limit rotational movement of the shift operating member 32 and the take-up member 34 in the first and second rotational directions $R_1$ and $R_2$. Specifically, as seen in FIG. 3, the arc-shaped control recess 33d defines a pair of circumferentially spaced second limiting portions 33e having circumferentially spaced oppositely facing second abutment surfaces. The second abutment surfaces of the second limiting portions 33e are configured and arranged to selectively contact the abutment surfaces of the projection 51c (first limiting portion) when the take-up member 34 is rotated to end positions, respectively. While contact between only one of the second limiting portions 33e with the projection 51c is illustrated in FIG. 3, it will be apparent to those skilled in the bicycle art from this disclosure that upon rotating the shift operating member 32 and the take-up member 34 in the first rotational direction $R_1$, the other second limiting portion 33e will contact the projection 51c.

The projection 51c (first limiting portion) of the mounting member 30 and the second limiting portions 33e of the shift operating member 32 constitute parts of a rotational angle limiting structure configured and arranged to limit rotational movement of the shift operating member 32 relative to the mounting member 30. Additionally, the lever portion 33a and the arc-shaped protruding sections 43f and 43g of the cover 42 can be configured and arranged to limit rotational movement of the shift operating member 32 relative to the mounting member 30 in one or both rotational directions $R_1$ and $R_2$. Specifically, the lever portion 33a may contact a arc-shaped protruding sections 43f and 43g of the cover 42 in one or both end positions (only one shown in FIG. 3).

The take-up member 34 basically includes a winding groove 34a and a wire mounting cutout 34b in communication with the wire winding groove 34a. The inner wire 21a preferably has an abutment member fixedly attached to its free end, which is retained in the wire mounting cutout 34b in a conventional manner. Thus, the inner wire 21a can be selectively wound/unwound about the winding groove 34a in response to rotation of the shift operating member 32 in the first and second rotational directions $R_1$ and $R_2$, respectively, as best understood from FIGS. 9 and 10.

Figure 9:
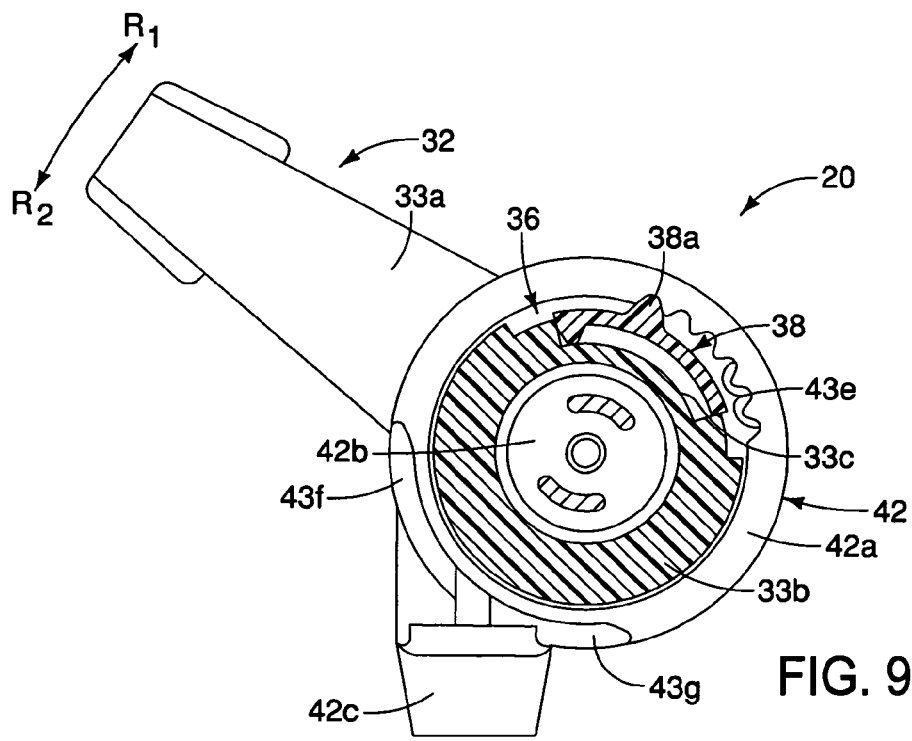
FIG. 9 is a bottom view of a partial assembly of the shift operating device illustrated in FIGS. 2 and 3, with portions broken away for the purpose of illustration and with the shift operating member located in a first shift position.
Figure 10:
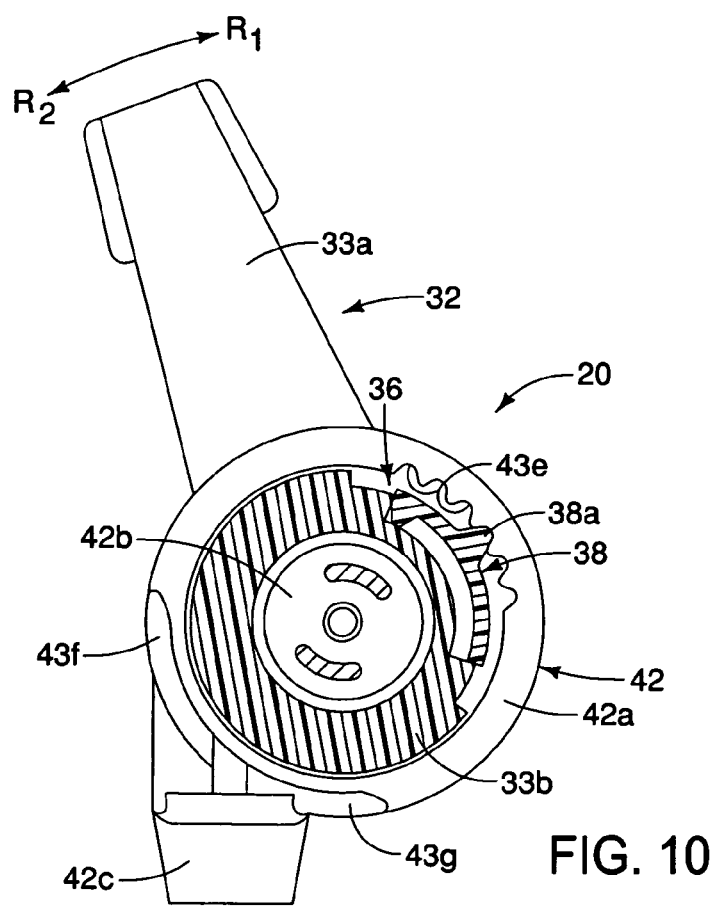
FIG. 10 is a bottom view of a partial assembly of the shift operating device illustrated in FIGS. 2 and 3, with portions broken away for the purpose of illustration and with the shift operating member located in a second shift position rotationally spaced from the first shift position.
Figure 11:
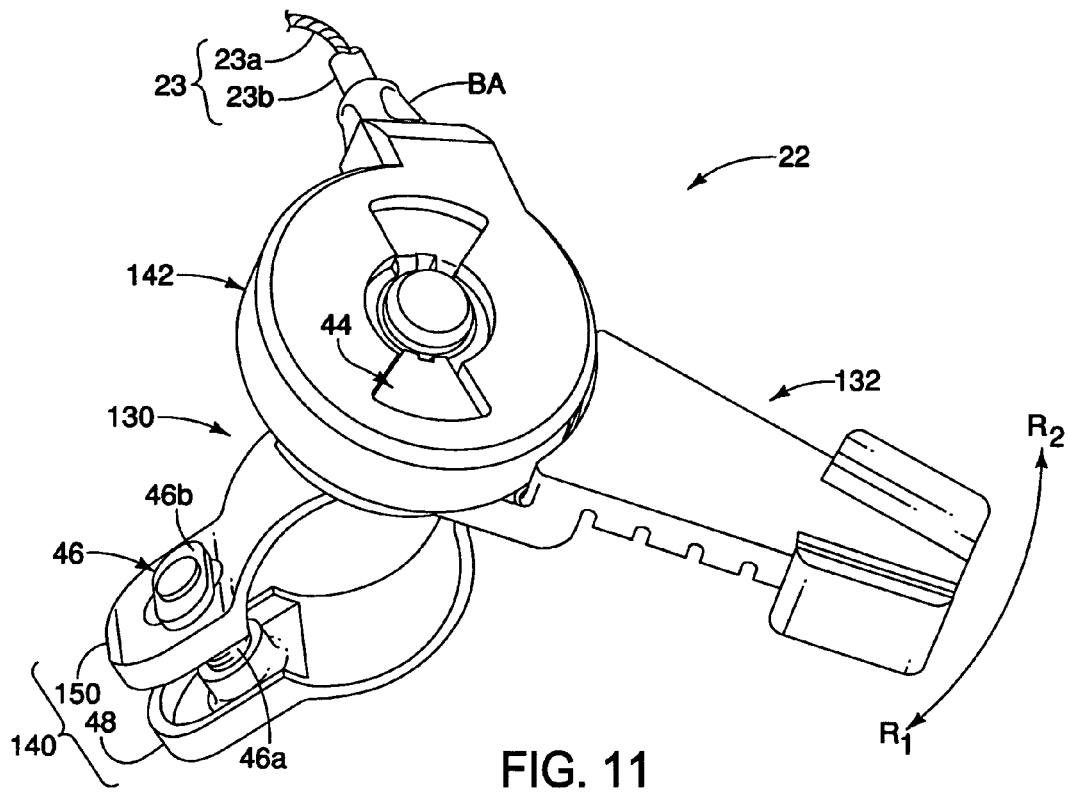
FIG. 11 is an enlarged top perspective view of the left hand side shift operating device of the bicycle illustrated in FIG. 1.
Figure 12:
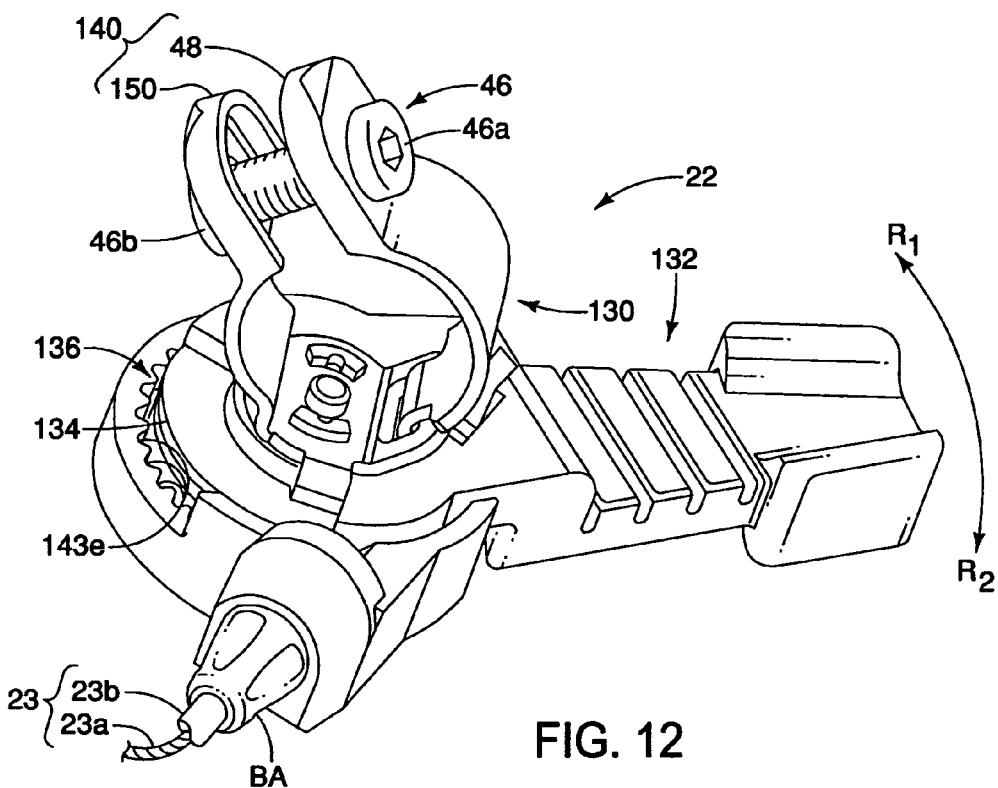
FIG. 12 a bottom perspective view of the left hand side shift operating device of the bicycle illustrated in FIG. 11.
Figure 13:
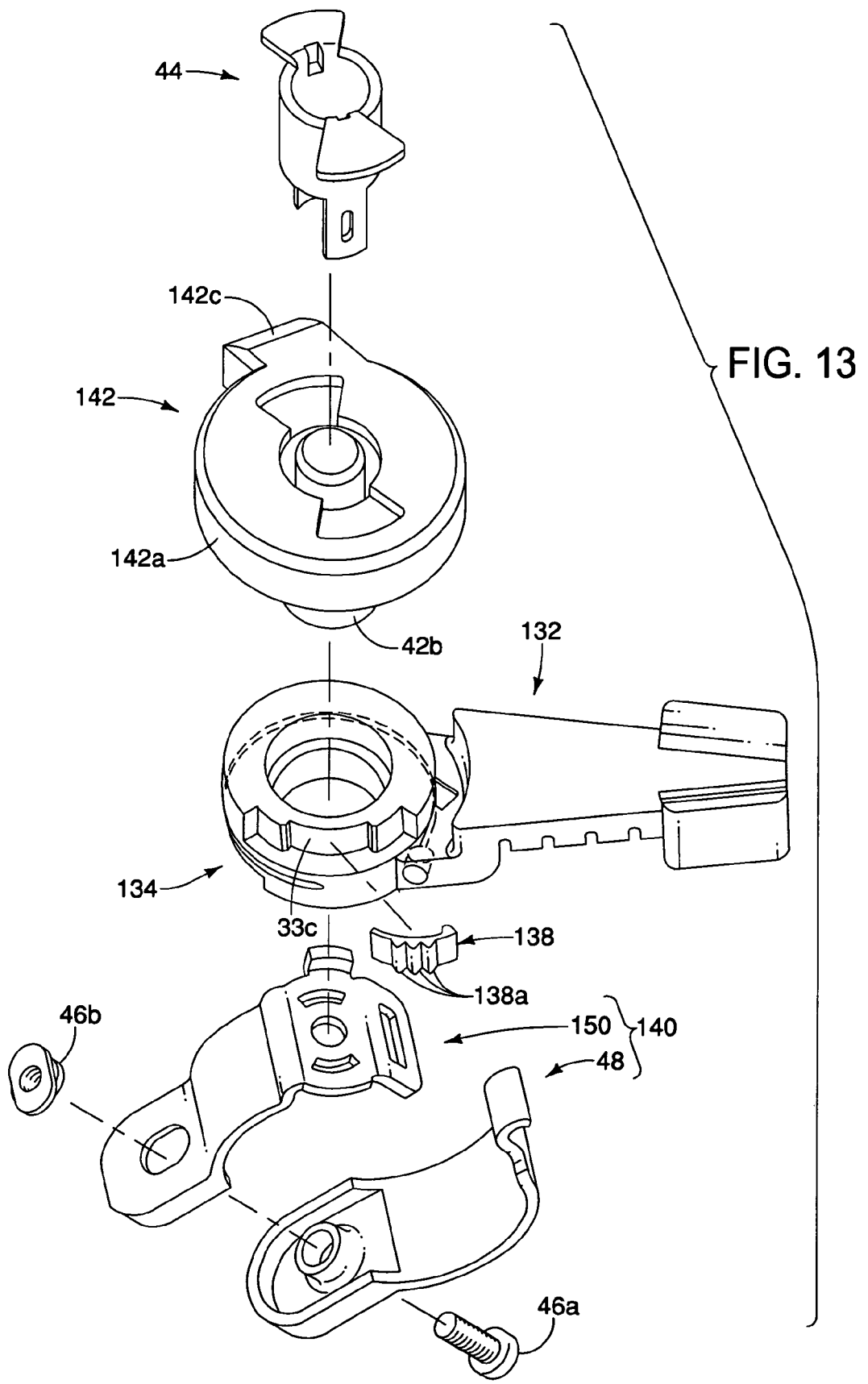
FIG. 13 is an exploded, upper perspective view of the left hand side shift operating device illustrated in FIGS. 11 and 12.
Figure 14:
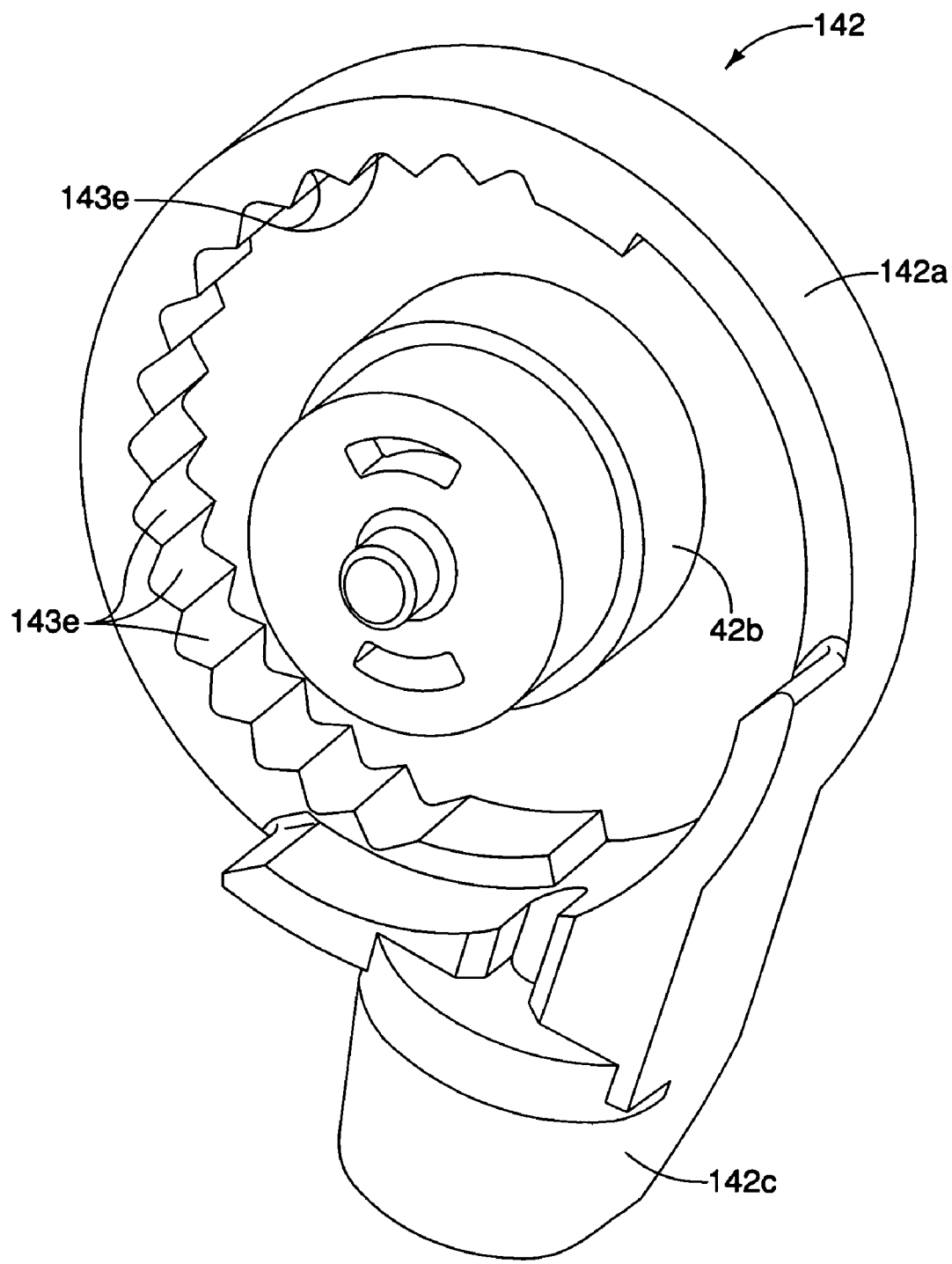
FIG. 14 is a further enlarged, lower perspective view of the cover of the shift operating device illustrated in FIGS. 11-13.

Referring now to FIGS. 9 and 10, a shift between a first shift position to a fourth shift position is illustrated. In other words, in this embodiment, each of the notches 43e represents a shift position, which corresponds to one lateral shift position of the rear derailleur 15. Thus, 6 shift positions are illustrated for a six-stage rear derailleur 15. However, it will be apparent to those skilled in the bicycle art from this disclosure that more/fewer shift positions can be provided if needed and/or desired. Moreover, it will be apparent to those skilled in the bicycle art from this disclosure that each notch 43e does not have to correspond to a particular shift position of the rear derailleur 15, as discussed below with respect to the front shift operating device 22. In other words, it will be apparent to those skilled in the bicycle art from this disclosure that the shift control device 20 can be constructed in a manner similar to the front shift operating device 22 (i.e., with more notches 43e and/or more detents 38, with each notch 43e not necessarily corresponding to a particular shift position of the rear derailleur 15.

Front Shift Operating Device

Referring now to FIGS. 11-14, the front (left) shift operating device 22 will now be explained in more detail. As mentioned above, the front (left) shift operating device 22 is substantially identical to the right (rear) shift operating device 20, except that the front shift operating device 22 is a mirror image of the rear shift operating device 20 and has a modified retaining mechanism 136. Accordingly, the following descriptions and illustrations of the front shift operating device 22 will focus on the modified retaining mechanism 136. Moreover, parts of the front shift operating device 22 that are identical and/or substantially identical to parts of the rear shift operating device 20 will not be explained and/or illustrated in detail herein.

Because the shift operating device 22 is substantially identical to the shift operating device 20, parts of the shift operating device 22 that are identical to parts of the shift operating device 20 will be given identical reference numerals, and parts of the shift operating device 22 that are functionally identical (but not exactly identical) to parts of the shift operating device 20 will be given the same reference numerals but with "100" added thereto. In other words, it will be apparent to those skilled in the art from this disclosure that the descriptions, illustrations and principles of the rear shift operating device 20 also apply to the front shift operating device 22, except as explained and/or illustrated herein.

The front shift operating device 22 basically includes a mounting member 130, a shift operating member 132, a take-up member 134, and the modified retaining mechanism 136. The shift operating member 132 and the take-up member 134 are mirror images of the shift operating member 32 and take-up member 34. Thus, shift operating member 132 and the take-up member 134 will not be discussed in further detail.

The modified retaining mechanism 136 is coupled between the mounting member 130 and the take-up member 134 to overrideably retain the take-up member 134 in a plurality shift positions relative to the mounting member 130 such that the rider can move the shift operating member 132 to initiate up/down shifts of the front derailleur 17.

The mounting member 130 basically includes a clamping portion 140, a cover 142 and an axle member 44 non-rotatably coupling the cover 142 to the clamping portion 140 to form a mounting space. The clamping portion 140 is a mirror image of the clamping portion 40. Thus, the clamping portion 140 basically includes a first clamping element 48 and a modified second clamping element 150 that is a mirror image of the second clamping element 50. Accordingly, the clamping elements 48 and 150 will not be explained or illustrated further herein.

The cover 142 is a mirror image of the cover 42, except the cover 142 includes a modified disc-shaped portion 142a. Thus, the cover 142 includes a bush 42b extending from the modified disc-shaped portion 142a, and a cable attachment member 142c that is a mirror image of the cable attachment member 42c. The disc-shaped portion 142a is a mirror image of the disc-shaped portion 42a, except the disc-shaped portion 142a includes a modified pawl mating structure which includes a plurality of notches 143e. Preferably there are a larger number of the notches 143e than the notches 43e. Also, the notches 143e are preferably circumferentially closer together than the notches 43e. Otherwise, the notches 143e are identical to the notches 43e.

A modified arc-shaped resilient pawl member 138 having a plurality of projecting teeth or detents 138a is mounted in the arc-shaped recess 33c of the shift operating member 132. The pawl member 138 is engaged with the notches 143e of the cover 142 to normally retain the take-up member 34 and the shift operating member 32 in a desired position relative to the mounting member 30. Specifically, the detents 138a are releasably received in the notches 143e. In the shift operating device 22, at least two (e.g. three) detents 138a are preferably provided. In the illustrated embodiment, the pawl member 138, which is coupled to the shift operating member 132, and the notches 143e of the cover 142 constitute parts of the modified retaining mechanism 136 in accordance with the present invention. Moreover, in the illustrated embodiment, the notches 143e constitute parts of a pawl mating structure that engages to pawl 138 to selectively retain the shift operating member 132 and the take-up member 134 in a plurality of shift positions. In the front shift operating device 22, the notches 143e do not correspond to any particular shift position of the front derailleur 17. In other words, even though typical front derailleurs usually include only two or three shift positions, a substantially larger number of notches 138a are provided so that the rider can move the shift operating member 132 until the front derailleur 17 is in the desired position relative to the front sprockets FS. Of course, it will be apparent to those skilled in the bicycle art from this disclosure that alternatively, the front shift operating device 22 can be constructed like the rear shift operating device 20 if needed and/or desired.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift operating device comprising:
a mounting member configured to be attached to a bicycle, the mounting member including a clamping portion and a cover removably attached to the clamping portion;
a shift operating member rotatably coupled to the mounting member to move about a rotational axis in a first rotational direction and a second rotational direction opposite to the first rotational direction;
a take-up member rotatably coupled to the mounting member, the take-up member being arranged and configured to selectively pull and release a shift control cable in response to rotation of the shift operating member in the first and second rotational directions, respectively;
a retaining mechanism coupled between the mounting member and the take-up member to retain the take-up member in a plurality of positions; and
a rotational angle limiting structure including a first limiting portion that is a projection formed on the clamping portion of the mounting member and a pair of circumferentially spaced second limiting portions formed on the shift operating member that selectively engage the first limiting portion to limit rotational movement of the shift operating member relative to the mounting member, the first limiting portion being non-movable relative to the clamping portion and being circumferentially arranged between the pair of second limiting portions with respect to the rotational axis such that one of the second limiting portions selectively engages the projection upon rotating the shift operating member in the first rotational direction and another of the second limiting portions selectively engages the projection upon rotating the shift operating member in the second rotational direction.

2. The bicycle shift operating device according to claim 1, wherein the shift operating member is at least partially disposed between the clamping portion and the cover.

3. The bicycle shift operating device according to claim 2, wherein
the cover includes a disc-shaped portion with a bush extending therefrom that is engaged with the clamping portion, and the shift operating member is rotatably supported about the bush at least partially between the cover and the clamping portion.

4. The bicycle shift operating device according to claim 3, wherein
the bush is integrally formed with the cover as a one-piece, unitary member.

5. The bicycle shift operating device according to claim 4, wherein
the mounting member includes an axle member non-rotatably coupled to the cover that extends through the bush with a free end of the axle member being non-rotatably attached to the clamping portion.

6. The bicycle shift operating device according to claim 1, wherein
the take-up member and the shift operating member are integrally formed together as a one-piece, unitary member.

7. The bicycle shift operating device according to claim 1, wherein
the retaining mechanism includes a pawl member coupled to the take-up element and a pawl mating structure coupled to the mounting member.

8. The bicycle shift operating device according to claim 7, wherein
the pawl member includes at least two detents engaged with corresponding portions of the pawl mating structure.

9. A bicycle shift operating device comprising:
a mounting member configured to be attached to a bicycle, the mounting member including a handlebar clamping portion configured to clamp on a tubular handlebar member and a cover removably attached to the handlebar clamping portion, the cover having a tubular bush integrally formed with the cover as a one-piece, unitary member;
a shift operating member rotatably mounted on the tubular bush of the mounting member to move in a first rotational direction and a second rotational direction opposite to the first rotational direction;
a take-up member rotatably mounted on the tubular bush of the mounting member, the tubular bush passing through a hole in the take-up member such that an outer circumferential surface of the tubular bush faces an inner circumferential surface of the take-up member, the take-up member being rigidly fixed to the shift operating member to selectively pull and release a shift control cable in response to rotation of the shift operating member in the first and second rotational directions, respectively; and
a retaining mechanism coupled between the mounting member and the take-up member to retain the take-up member in a plurality of positions.

10. The bicycle shift operating device according to claim 9, wherein
the mounting member includes an axle member non-rotatably coupled to the cover that extends through the tubular bush with a free end of the axle member being non-rotatably attached to the clamping portion.

11. The bicycle shift operating device according to claim 9, wherein
the mounting member includes an axle member non-rotatably coupled to the cover that extends through the tubular bush with a free end of the axle member being non-rotatably attached to the clamping portion.

12. The bicycle shift operating device according to claim 9, wherein
the take-up member and the shift operating member are integrally formed together as a one-piece, unitary member.

13. The bicycle shift operating device according to claim 12, wherein
the tubular bush has a stepped external shape that is received in a stepped mating hole of the shift operating member having the take-up member integrally formed therewith.

14. The bicycle shift operating device according to claim 9, wherein
the retaining mechanism includes a pawl member coupled to the take-up element and a pawl mating structure coupled to the mounting member.

15. The bicycle shift operating device according to claim 14, wherein
the pawl member includes at least two detents engaged with corresponding portions of the pawl mating structure.

* * * * *